(12) United States Patent
Fabre et al.

(10) Patent No.: US 11,401,823 B2
(45) Date of Patent: Aug. 2, 2022

(54) AIRCRAFT TURBOMACHINE PROVIDED WITH AN UNDUCTED PROPELLER WITH BLADES HAVING A COMPOSITE-MATERIAL INSERT BONDED TO THEIR LEADING EDGES

(71) Applicant: SAFRAN AIRCRAFT ENGINES, Paris (FR)

(72) Inventors: Adrien Jacques Philippe Fabre, Montrouge (FR); Vivien Mickaël Courtier, Yerres (FR); Adrien Louis Nicolas Laurenceau, Melun (FR); Dominique Gerhadt Mayhew, Brie Comte Robert (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 275 days.

(21) Appl. No.: 16/086,209

(22) PCT Filed: Mar. 17, 2017

(86) PCT No.: PCT/FR2017/050624
§ 371 (c)(1),
(2) Date: Sep. 18, 2018

(87) PCT Pub. No.: WO2017/162964
PCT Pub. Date: Sep. 28, 2017

(65) Prior Publication Data
US 2020/0300099 A1 Sep. 24, 2020

(30) Foreign Application Priority Data

Mar. 21, 2016 (FR) ..................................... 1652416

(51) Int. Cl.
*F01D 5/28* (2006.01)
*B64C 11/26* (2006.01)
(Continued)

(52) U.S. Cl.
CPC ............ *F01D 5/282* (2013.01); *B64C 11/205* (2013.01); *B64C 11/26* (2013.01);
(Continued)

(58) Field of Classification Search
CPC ....... F01D 5/282; B64C 11/205; B64C 11/26; B64C 2027/4736; F05D 2240/303;
(Continued)

(56) References Cited

U.S. PATENT DOCUMENTS

| 4,966,527 A | * | 10/1990 | Merz | ....................... B29C 70/30 416/241 R |
| 5,392,514 A | * | 2/1995 | Cook | ....................... B29C 70/86 29/889.71 |

(Continued)

FOREIGN PATENT DOCUMENTS

| EP | 0 753 098 A1 | 1/1997 |
| EP | 2 353 830 A2 | 8/2011 |

(Continued)

OTHER PUBLICATIONS

International Search Report as issued in International Patent Application No. PCT/FR2017/050624, dated Jun. 2, 2017.

*Primary Examiner* — Woody A Lee, Jr.
*Assistant Examiner* — Jesse M Prager
(74) *Attorney, Agent, or Firm* — Pillsbury Winthrop Shaw Pittman LLP

(57) ABSTRACT

An aviation turbine engine having at least one unducted rotary propeller having a plurality of blades, each blade including: a blade body made of composite material including fiber reinforcement densified by a matrix, the fiber reinforcement of the blade body presenting three-dimensional weaving, the body extending between a leading edge and a trailing edge, and a protective fitting for protecting the leading edge and made of composite material having fiber (Continued)

reinforcement densified by a matrix, the fitting being adhesively bonded onto the leading edge of the blade body, the fitting being formed from a dry fiber preform injection molded with a densifying resin, and a polyurethane film for providing protection against erosion covering the blade body and the fitting.

17 Claims, 2 Drawing Sheets

(51) Int. Cl.
    *B64C 11/20*     (2006.01)
    *B64D 27/00*     (2006.01)

(52) U.S. Cl.
    CPC .. *B64D 2027/005* (2013.01); *F05D 2240/303* (2013.01); *F05D 2300/44* (2013.01); *F05D 2300/603* (2013.01); *F05D 2300/702* (2013.01)

(58) Field of Classification Search
    CPC ....... F05D 2300/6012; F05D 2300/603; F05D 2300/6034; F05D 2300/702; F05D 2300/44; F05D 2220/325; B64D 2027/005
    See application file for complete search history.

(56) References Cited

U.S. PATENT DOCUMENTS

| | | |
|---|---|---|
| 7,780,420 B1 | 8/2010 | Matheny |
| 2006/0257260 A1* | 11/2006 | Dambrine ............. F04D 29/023 416/230 |
| 2010/0008788 A1* | 1/2010 | Barbee .................... F01D 5/288 416/224 |
| 2010/0239421 A1* | 9/2010 | Boston ................... B64C 11/06 416/136 |
| 2011/0052405 A1* | 3/2011 | Parkin .................. F04D 29/023 416/230 |
| 2011/0059290 A1* | 3/2011 | Gage ....................... F01D 5/282 428/99 |
| 2011/0194941 A1* | 8/2011 | Parkin .................. F04D 29/023 416/224 |
| 2012/0207608 A1* | 8/2012 | Ebert ........................ F01D 5/28 416/223 R |
| 2013/0272893 A1* | 10/2013 | Fabre ................... F04D 29/324 416/226 |
| 2014/0030105 A1* | 1/2014 | Fameau ................ F04D 29/023 416/229 A |
| 2015/0044056 A1* | 2/2015 | Hodgson ................ F01D 5/146 416/224 |
| 2016/0010468 A1* | 1/2016 | Kray ........................ F01D 5/28 415/200 |

FOREIGN PATENT DOCUMENTS

| | | | |
|---|---|---|---|
| EP | 2 551 461 A2 | 1/2013 | |
| WO | WO 95/25877 A1 | 9/1995 | |
| WO | WO-2015004362 A1 * | 1/2015 | ........... D03D 25/005 |

* cited by examiner

| E1 | Fabricate the fitting |
| E2 | Fabricate the blade body |
| E3 | Machine the leading edge |
| E4 | Spread adhesive on the leading edge |
| E5 | Bond the fitting to the leading edge |

AIRCRAFT TURBOMACHINE PROVIDED WITH AN UNDUCTED PROPELLER WITH BLADES HAVING A COMPOSITE-MATERIAL INSERT BONDED TO THEIR LEADING EDGES

CROSS REFERENCE TO RELATED APPLICATIONS

This application is the U.S. National Stage of PCT/FR2017/050624 filed Mar. 17, 2017, which in turn claims priority to French Application No. 1652416, filed Mar. 21, 2016. The contents of both applications are incorporated herein by reference in their entirety.

BACKGROUND OF THE INVENTION

The present invention relates to the general field of aviation turbine engines having unducted propellers. The invention relates more particularly to protecting the leading edges of composite material blades of an unducted propeller of an aviation turbine engine, e.g. a turboprop or a turbojet.

The blades of a turboprop or turbojet propeller may be subjected to impacts from birds, ice, or other debris while the engine is in operation. Generally, the blades of a propeller can be made out of metal alloy or out of composite material. In order to reduce the weight of the engine, it is known to make use of blades made of composite material. Specifically, composite materials present mechanical strength that is satisfactory when compared with the metal alloys that have been used in the past, while also being lighter in weight.

Nevertheless, blades made of composite material are not as strong in the event of an impact, and they withstand erosion less well than metal blades, in particular on their leading edges.

By way of example, it is known to make use of metal foil adhesively bonded to the leading edge of a composite material fan blade of a ducted fan turbojet. Under such circumstances, the metal foil protects the blade in very satisfactory manner in the event of objects being ingested into the engine, and it also protects the leading edge against erosion.

Nevertheless, such a solution is expensive to implement because of the complexity of the metal foil that needs to be fabricated so as to match closely the aerodynamic profile of the blade.

It is also known to use a metal foil, e.g. made of a nickel-based alloy and obtained by electroforming on a mandrel, and to bond it adhesively on the leading edge of a composite material propeller blade. Such foils provide good strength against erosion and impacts, and they are relatively easy to fabricate.

Nevertheless, the use of that method is limited by the lack of diversity in the grades of material that can be used, and by the shape of the foil, which generally cannot be made to be complex.

Furthermore, in both of the above situations, the difference in stiffness between a foil made of metal and a blade made of composite material means that the adhesive used for securing the metal foil to the blade can become sheared. This results in increased risk of the foil separating as a result of an impact.

Another drawback of protecting the leading edge of a blade with a foil made of metal is the corresponding increase in weight that that involves for the engine.

OBJECT AND SUMMARY OF THE INVENTION

A main object of the present invention is thus to mitigate the above-mentioned drawbacks by proposing an aviation turbine engine having at least one unducted rotary propeller, each propeller being provided with a plurality of blades, each blade comprising:

a blade body made of composite material comprising fiber reinforcement densified by a matrix, said body extending between a leading edge and a trailing edge; and a protective fitting for protecting the leading edge and made of composite material having fiber reinforcement densified by a matrix, said fitting being adhesively bonded onto the leading edge of the blade body.

By way of example, the term "unducted propeller" is used to designate equally well an unducted propeller of a turboprop or an unducted fan propeller of a turbojet. Thus, the term "unducted" covers any propeller for which each blade at its end remote from the axis of rotation of the propeller is free from any surrounding, i.e. is not associated with any casing.

In turbojets having unducted fans, e.g. of the open rotor type, or in turboprops having unducted propellers, the blades rotate at a speed that is slower than do the blades of a fan in a ducted fan turbojet (also known as a "turbofan"). Thus, in the event of an impact, the blades of an unducted propeller are stressed to a smaller extent than are the blades of a ducted propeller, which blades require greater impact strength because of their higher speed of rotation.

When rotating at a lower speed, one possible solution for reducing the weight of the blades while avoiding the use of metal foil, in particular in order to reduce any risk of the foil separating, might merely be to eliminate the metal foil from the blades. Nevertheless, it would be difficult to obtain a satisfactory aerodynamic profile directly, in particular at the leading edge, while making use only of conventional methods for fabricating blades out of composite material. Specifically, the blades need to be accurately machined, which increases fabrication time and costs. Furthermore, the leading edges of blades machined for that purpose present surfaces that are irregular, including facets resulting from the multiple machining passes that are needed. Such machining requires manual operations that are expensive and poorly repeatable. In addition, the aerodynamic profile of the resulting blades is not satisfactory.

An aviation turbine engine of the invention, such as a turbojet or a turboprop, includes a fitting for protecting the leading edge, which fitting is made of composite material and serves to re-establish the aerodynamic profile of the composite material blade at its leading edge, while also protecting it in the event of an impact, but without presenting the above-mentioned drawbacks of using metal foil. Specifically, the fitting is lighter in weight and easier to fit than a metal foil fitting. In addition, with the invention, there is no problem of an interface between a metal and a composite material. This serves in particular to limit any problems associated with foil becoming separated, since, in operation, the adhesive is no longer subjected to shear.

Furthermore, such a composite protective fitting is easy to make and to bond onto the blade body made of composite material. In comparison, adhesively bonding metal foil onto a body made of composite material requires the surface of the body to be prepared, e.g. by sand-blasting, in order to ensure that the foil adheres. These operations are not needed in the aviation turbine engine of the invention.

Nevertheless, it can be advantageous for the leading edge of the blade body to be machined roughly in order to enable the fitting to fit closely to the blade body. The fitting may present a section that is substantially U-shaped. By way of example, the blade body may be in the form of a tenon in the vicinity of the leading edge, so as to enable said body and the fitting to interfit. The blade body and the fitting can form a tenon-and-mortise type connection. Thus, there can be continuity between the fitting and the pressure side and suction side faces of the blade body so as to avoid degrading the aerodynamic quality of the blade.

The fiber reinforcement of the blade body presents three-dimensional weaving.

The fitting is made from a dry fiber preform that has a densification resin injection molded therein. A dry fiber preform densified by a matrix by means of an injection molding method presents good mechanical strength. In particular, the fiber reinforcement may be embedded in the matrix, thereby ensuring good distribution of forces throughout the fitting in the event of an impact. Such a fitting may present shapes that are complex.

In an embodiment, the dry fiber preform may comprise at least one fiber layer presenting two-dimensional weaving. In a variant, the dry fiber preform may present three-dimensional weaving.

In a variant that does not form part of the present invention, the fiber reinforcement of the fitting is obtained from a stack of pre-impregnated plies. This provision presents the advantage of being easy to implement industrially.

The aviation turbine engine of the invention further comprises a polyurethane film for providing protection against erosion and covering the blade body and the fitting. Such a polyurethane film enables the blade to be given a surface state that imparts good resistance to erosion thereto.

A certain amount of surface roughness can result from the method of fabricating the fitting, which consists in making it from a dry fiber preform that has been injection molded with a densification resin. Advantageously, the polyurethane film is designed to compensate for any irregularities that might come from the dry fiber preform, by flattening out surface roughnesses.

The leading edge of the blade body may present a tenon shape in cross-section, and the fitting may present a U-shape in cross-section so that the fitting restores the aerodynamic profile to the leading edge. In order to obtain such a section for the leading edge of the blade body, the body may be machined. The term "tenon shape in cross-section" is used to mean that the blade body presents a cross-section of the same type as a tenon, i.e. with two size-reducing steps on either side of a portion that is of smaller thickness than the remainder of the body. The term "restores the aerodynamic profile to the leading edge" is used to mean that there is surface continuity between the faces of the blade body and of the fitting, i.e. that there is no step or offset.

It can be advantageous for the fitting to present thickness that is substantially constant so as to make it easier to fabricate and put into place.

Nevertheless, it is possible for the fitting to present varying thickness, e.g. thickness in its portion situated in the vicinity of the leading edge of the blade body that is greater than its thickness in its portions covering part of the pressure side and suction side faces of the blade body. Under such circumstances, the fiber reinforcement of the fitting may be obtained from a fiber preform that comprises a fiber layer presenting two-dimensional weaving or from a fiber preform presenting three-dimensional weaving, in which the diameter of the yarns used for the weaving varies across the weave.

The invention also provides a method of fabricating an unducted rotary propeller blade for an aviation turbine engine, the method comprising at least the following steps:

fabricating a blade body out of composite material having fiber reinforcement densified by a matrix, said body extending between a leading edge and a trailing edge, the fiber reinforcement of the blade body presenting three-dimensional weaving;

fabricating a protective fitting for protecting the leading edge out of composite material having fiber reinforcement densified by a matrix; and adhesively bonding the fitting onto the leading edge of the blade body.

The fitting is fabricated from a dry fiber preform molded by injecting a densification resin, e.g. in a mold that has the shape of the fitting. Such an injection molding method is also known as resin transfer molding (RTM).

The method of the invention also comprises forming a polyurethane film on the blade body and the fitting so as to cover the blade body and the fitting with said polyurethane film.

In a variant that does not form part of the present invention, the fitting may comprise stacking pre-impregnated plies in compression tooling.

The leading edge of the blade body may present a tenon shape in cross-section and the fitting may present a U-shape in cross-section so that the fitting restores the aerodynamic profile of the leading edge, and, prior to adhesively bonding the fitting on the leading edge of the blade body, the method may thus include a step of machining the leading edge of the blade body so as to impart a tenon-shaped cross-section thereto.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

The invention applies to making unducted propeller blades for aviation turbine engines, e.g. for a turboprop or a turbojet. More generally, the invention applies to making unducted propeller blades having requirements concerning impact resistance that are less severe than for ducted propeller blades. The unducted propellers in question may be characterized by having a speed of rotation that is lower than the speed of rotation of ducted propellers. For example, the maximum peripheral speed of rotation of the blades of an unducted propeller of a turboprop or a turbojet is less than 260 meters per second (m/s), whereas in a turbojet having a ducted fan, that speed may be as great at 460 m/s.

Figure 1:
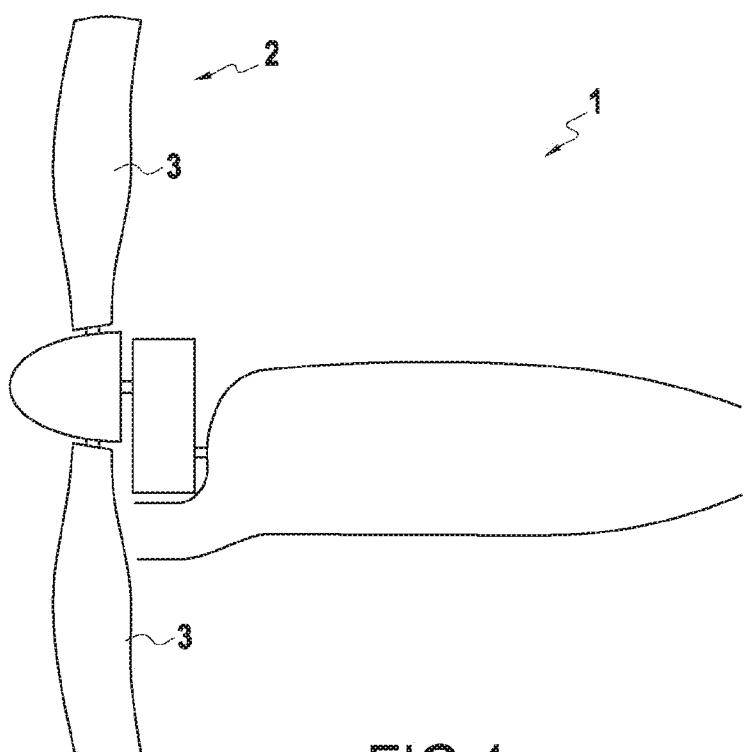
FIG. 1 shows a turboprop having an unducted fan.
Figure 2:
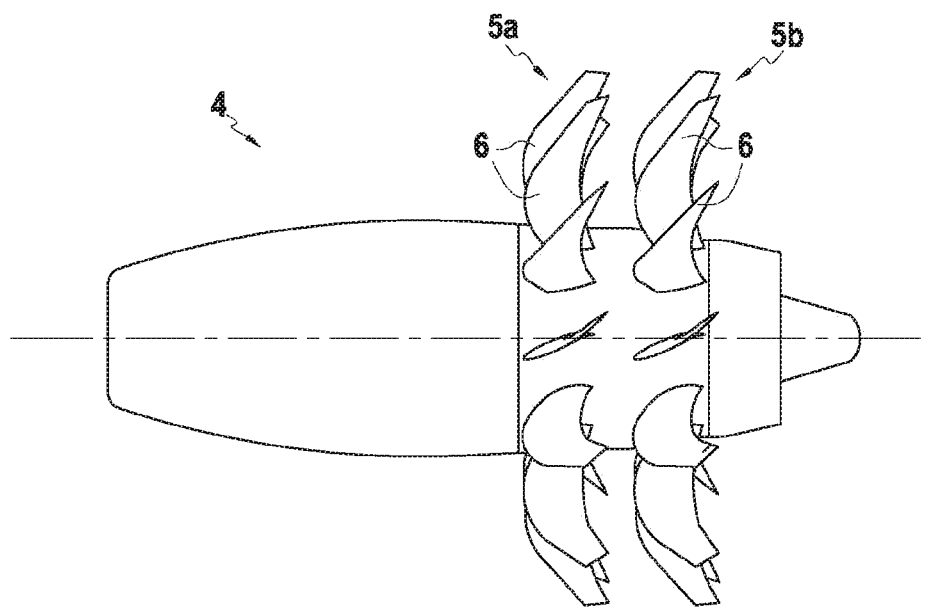
FIG. 2 shows a turbojet having an unducted fan.

FIG. 1 is a diagrammatic view of a turboprop 1 having an unducted propulsive propeller 2 with a plurality of blades 3. FIG. 2 is a diagrammatic view of a turbojet 4 having an unducted fan provided with two unducted propellers 5a and 5b that are propulsive and contrarotating, each propeller having a plurality of blades 6. The invention applies equally well to the blades 3, 6 both of the above-described turboprop 1 and of the turbojet 4, providing the blades form part of a propeller 3, 5a, 5b that is unducted.

Figure 3:
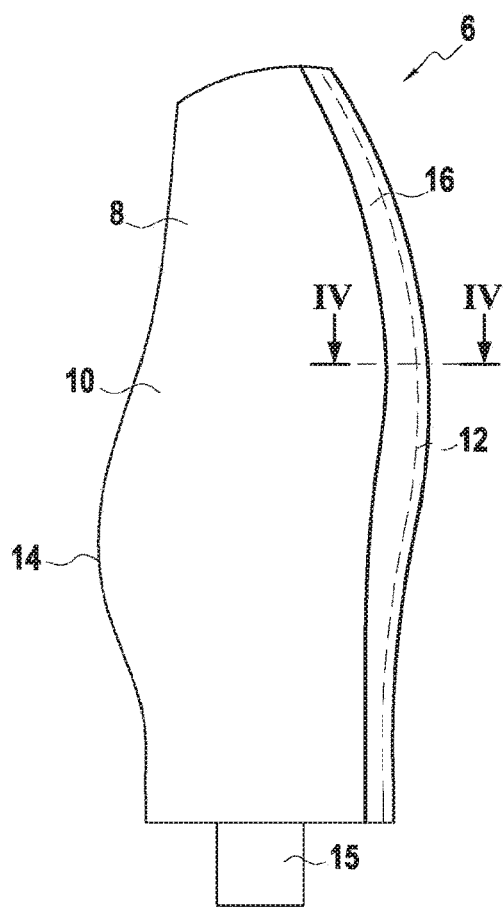
FIG. 3 shows a fan for a turbojet or a turboprop in an embodiment of the invention.
Figure 4:
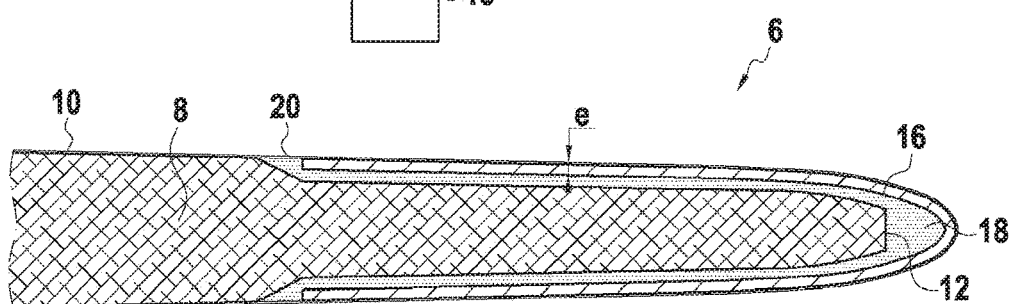
FIG. 4 is a section view of the FIG. 3 blade showing its leading edge.

FIGS. 3 and 4 show respectively a blade 6 in an embodiment of the invention, and a section view of a portion of the FIG. 3 blade 6. In known manner, such a blade 6 has a blade body 8 with a pressure side face 9 (FIG. 4) and a section side face 10, the body extending transversely between a leading edge 12 and a trailing edge 14. The blade 6 shown also has a root 15 for mounting the blade on a rotor.

The blade body 8 is made of composite material comprising fiber reinforcement densified by a matrix. The fiber reinforcement of the body is preferably obtained from a fiber preform made by three-dimensional weaving. By way of example, the matrix of the body 8 may be ceramic or organic, and it may be obtained from a densification resin, for example.

In accordance with the invention, the leading edge 12 of the blade 6 is protected by a protective fitting 16 for protecting the leading edge 12, which fitting is made of composite material having fiber reinforcement densified by a matrix. In this example, the fitting 16 is adhesively bonded directly onto the leading edge 12 of the blade 6. In the example shown, the fitting 16 extends on either side of the body 8 and overlies parts of both the pressure side face 9 and the suction side face 10 of the body 8. In this example, the body 8 in the vicinity of the leading edge 12 is in the shape of a tenon so as to enable the fitting 16 to be fitted closely to the leading edge 12, while avoiding the presence of any discontinuities between the body 8 and the fitting 16. In this example, the fitting 16 presents a U-shaped cross-section so that the fitting 16 restores the aerodynamic profile of the leading edge 12. In this example, the fitting 16 holds the leading edge 12 of the body 8 like a vice. The fitting 16 and the body 8 can thus be assembled together using a tenon-and-mortise type connection. The fitting 16 co-operates with the leading edge 12 of the blade so as to provide continuity between the faces 8 and 9 and the outside surface of the fitting 16. In the example shown, the fitting 16 extends longitudinally over the entire length of the leading edge 12, but, in a variant, it may be observed that it could extend longitudinally over only a portion of said edge 12.

Figure 5:
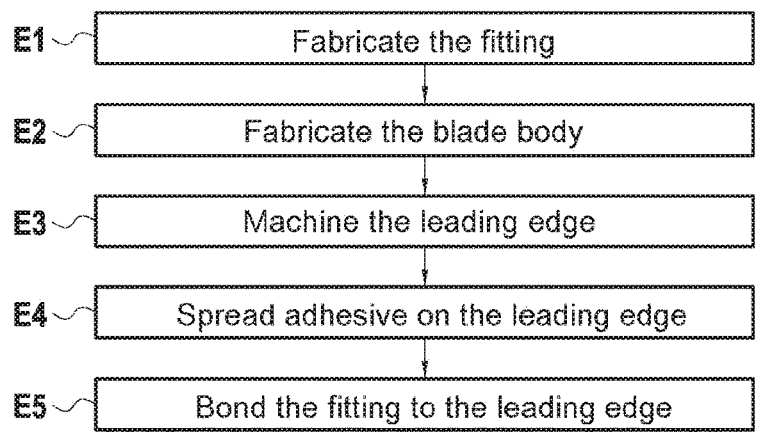
FIG. 5 is a flow chart showing the various steps of a method of fabricating a blade for an aviation turbine engine in an implementation of the invention.

FIG. 5 is a flow chart showing the steps of a method of fabricating a blade in an embodiment of the invention.

In a first step E1, a fitting 16 is fabricated out of composite material.

The fitting 16 may be fabricated in several ways. In one method of fabrication of the invention, the fitting 16 is fabricated by injecting a resin into a dry fiber preform by means of a technique known as resin transfer molding (RTM). For that purpose, an injection mold having the shape of the fitting 16 is made available and the dry fiber preform is positioned therein, after which a resin is injected under pressure into the inside of the mold, the resin is solidified, and the fitting 16 as fabricated in this way is extracted from the mold.

In another method of fabrication that does not form part of the present invention, the fitting 16 is made from a stack of plies of two-dimensional fabric that are pre-impregnated with resin (known as "prepregs") that are shaped and compacted in appropriate compression tooling. Thereafter, the resin is solidified in order to obtain the fitting 16.

In yet another method of fabrication that does not form part of the present invention, it is also possible to fabricate the fitting 16 using known automatic draping or filament deposition techniques.

In a second step E2, the body 8 that is to receive the fitting 16 is fabricated.

The step E1 and the step E2 may equally well be performed simultaneously or one after the other.

The fiber reinforcement of the body 8 and of the protective fitting 16 may comprise carbon fibers, or more generally ceramic fibers. A fiber preform for fabricating the fitting 16 may comprise fabric obtained by two-dimensional weaving, e.g. of the plain, twill, or satin type. For the body 8, a fiber preform made by three-dimensional weaving is used.

The densification resin used in the RTM method or in the pre-impregnated plies may be a thermosetting resin belonging to the family of epoxies, bismaleimides, polyimides, polyesters, vinyl esters, cyanate esters, phenolics, etc. Alternatively, the resin may be a thermoplastic resin of any of the following types: polyphenylene sulfide (PPS), polysulfone (PS), polyether sulfone (PES), polyamide-imide (PAI), polyetherimide (PEI), or indeed the family of polyaryletherketones (PAEK): PEK, PEKK, PEEK, PEKKEK, etc.

The resin is solidified or hardened by curing for a thermosetting resin or by cooling for a thermoplastic resin. The temperature of the injection mold or of the compression tooling may be regulated by any known regulation means, e.g. by using heating cartridges, by regulation in water or oil, by an induction heater system, etc.

Once the body 8 has been fabricated, it can be machined roughly at its leading edge 12 (step E3) so that the fitting 16 can fit closely to the leading edge 12. Such prior machining also serves to avoid the fitting 16 modifying the aerodynamic profile of the blade, while ensuring continuity between the body 8 and the fitting 16 over the pressure side and suction side faces 9 and 10. In other words, the machining enables the surface of the fitting 16 on the outside, i.e. its surface opposite from its surface in contact with the adhesive, lies at the same level as the faces 9 and 10 of the body 8.

In a fourth step E4, a layer of adhesive 18 is spread on the leading edge 12 and on the portions of the faces 9 and 10 of the body 9 that are to receive the fitting 16. Thereafter, the fitting 16 is placed on the adhesively coated zones in order to be bonded thereto (step E5). Depending on the type of adhesive 18 used, it may possibly be necessary to solidify it. By way of example, the adhesive forming the adhesive layer 18 may be selected from among epoxy adhesives.

In the example shown, the fitting 16 presents a thickness e that is constant, thereby making it easier to fabricate.

In a variant, it is possible to make a fitting 16 that presents varying thickness, e.g. greater thickness at the leading edge 12. In order to vary the thickness of the fitting 16, it is possible, by way of example, to make use of yarns of different sizes within the above-mentioned fabrics while they are being woven, or else to have recourse to a fiber preform that is woven three-dimensionally.

By way of example, the thickness e of the fitting may lie in the range 0.5 millimeters (mm) to 2 mm, and preferably in the range 0.5 mm to 1.5 mm. The inside radius of curvature of the fitting 16 at the leading edge 12 may be 1 mm, for example.

In order to provide the composite material blade 6 with better protection against erosion, the body 8 and the fitting 16 are covered in an anti-erosion film 20. In this example, such an anti-erosion film is a polyurethane film. By way of example, the anti-erosion film 20 may be deposited by spraying liquid polyurethane onto the blade 6, with the polyurethane then being solidified, e.g. by being polymerized, so as to form the film 20. In a variant, the anti-erosion film 20 may be deposited directly in the form of a prefabricated film. Advantageously, the film 20 may also enhance the mechanical strength of the fitting 16 on the leading edge 12, and also the cohesion of the assembly, in particular in the event of impacts, by minimizing the probability of any yarns or strands of the weaving projecting externally. In particular, cohesion may be optimized concerning strands or yarns of the fiber preform of the fitting that protects the leading edge.

The invention claimed is:

1. An aviation turbine engine having at least one unducted rotary propeller having a plurality of blades, each blade comprising:
   a blade body made of composite material comprising fiber reinforcement and a first matrix, the fiber reinforcement of the blade body presenting three-dimensional weaving, said blade body extending transversally in a transverse direction between a leading edge and a trailing edge and longitudinally in a longitudinal direction between a root and a tip;
   a protective fitting for protecting the leading edge and made of composite material having fiber reinforcement and a second matrix, said fitting being bonded onto the leading edge of the blade body after densification of the blade body and solely using adhesive, said fitting extending longitudinally from the tip of said blade body and over the entire length of the leading edge and extending along the transverse direction between a first end and a second end, said fitting being formed from a dry fiber preform that is injection molded and solidified prior to being bonded onto the leading edge of the blade body; and
   a polyurethane film for providing protection against erosion covering the blade body, the adhesive, and the fitting,
   wherein, in a transverse cross section of the blade:
      a thickness of the adhesive provided between a forward transverse end of the leading edge and the second end of protective fitting along a transverse direction is greater than a thickness of the adhesive provided between the blade body and the first end of the protective fitting, and
      the adhesive is provided between the blade body and the first end of the protective fitting and has a transverse thickness between an edge of the blade body and an edge of the first end of the fitting that is covered by the polyurethane film.

2. The turbine engine according to claim 1, wherein the dry fiber preform comprises at least one fiber layer presenting two-dimensional weaving.

3. The turbine engine according to claim 1, wherein the dry fiber preform presents three-dimensional weaving.

4. The turbine engine according to claim 1, wherein the leading edge of the blade body presents a tenon shape in cross-section, and the fitting presents a U-shape in cross-section so that the fitting restores the aerodynamic profile to the leading edge.

5. The turbine engine according to claim 1, wherein a cross-section of the fitting presents a constant thickness around the leading edge.

6. A method of fabricating a blade for an unducted rotary propeller of an aviation turbine engine, the method comprising:
   fabricating a blade body out of composite material having fiber reinforcement densified by a first matrix, said blade body extending transversally in a transverse direction between a leading edge and a trailing edge and longitudinally in a longitudinal direction between a root and a tip, the fiber reinforcement of the blade body presenting three-dimensional weaving;
   fabricating a protective fitting for protecting the leading edge out of composite material having fiber reinforcement densified by a second matrix, said fitting extending longitudinally from the tip of said blade body and over the entire length of the leading edge and extending along the transverse direction between a first end and a second end and the fitting being fabricated from a dry fiber preform that is injection molded and solidified;
   bonding the fitting that is solidified onto the leading edge of the blade body solely using adhesive and after densification of the blade body, said fitting extending longitudinally from the tip of said blade body and over the entire length of the leading edge; and
   forming a polyurethane film on the blade body and the fitting so as to cover the blade body, the adhesive, and the fitting with said polyurethane film,
   wherein, in a transverse cross section of the blade:
      a thickness of the adhesive provided between a forward transverse end of the leading edge and the second end of protective fitting along a transverse direction is greater than a thickness of the adhesive provided between the blade body and the first end of the protective fitting, and
      the adhesive is provided between the blade body and the first end of the protective fitting and has a transverse thickness between an edge of the blade body and an edge of the first end of the fitting that is covered by the polyurethane film.

7. The method according to claim 6, wherein the dry fiber preform comprises at least one fiber layer presenting two-dimensional weaving.

8. The method according to claim 6, wherein the dry fiber preform presents three-dimensional weaving.

9. The method according to claim 6, wherein the leading edge of the blade body presents a tenon shape in cross-section and the fitting presents a U-shape in cross-section so that the fitting restores the aerodynamic profile of the leading edge, the method including, prior to adhesively bonding the fitting on the leading edge of the blade body, a step of machining the leading edge of the blade body so as to impart a tenon-shaped cross-section thereto.

10. The method according to claim 9, wherein the cross-section of the fitting presents a constant thickness around the leading edge.

11. The turbine engine according to claim 4, wherein the cross-section of the fitting presents a constant thickness around the leading edge.

12. The turbine engine according to claim 1, wherein the leading edge of the blade body has a transverse cross-section that is different from a transverse cross-section of the protective fitting.

13. The turbine engine according to claim 12, wherein the leading edge of the blade body presents a tenon shape in cross-section, and the fitting presents a U-shape in cross-section with a constant thickness around the leading edge so that the fitting restores the aerodynamic profile to the leading edge.

14. The method according to claim 6, wherein the leading edge of the blade body has a transverse cross-section that is different from a transverse cross-section of the protective fitting.

15. The method according to claim 14, wherein the leading edge of the blade body presents a tenon shape in cross-section and the fitting presents a U-shape in cross-section with a constant thickness around the leading edge so that the fitting restores the aerodynamic profile of the leading edge, the method including, prior to adhesively bonding the fitting on the leading edge of the blade body, a step of machining the leading edge of the blade body so as to impart a tenon-shaped cross-section thereto.

16. The turbine engine according to claim 1, wherein the protective fitting is spaced apart entirely in said transverse cross section of the blade from the blade body using said adhesive so that no contact exists in said transverse cross section of the blade between the protective fitting and the blade body.

17. The turbine engine according to claim 16, wherein, in said transverse cross section of the blade, an entire region extending from the forward transverse end of the leading edge and the second end of protective fitting is filled with said adhesive.

* * * * *